Patented May 5, 1942

2,281,612

UNITED STATES PATENT OFFICE 2,281,612

IODINE COMPOUND AND METHOD FOR PRODUCING THE SAME

Paul John Witte, New York, N. Y., assignor to Tyler Laboratories, Incorporated, Brooklyn, N. Y., a corporation of New York No Drawing. Application December 12, 1939, Serial No. 308,777

6 Claims. (Cl. 167—70)

The present invention relates to iodine compounds and the method for producing the same. The compounds referred to are suitable in some phases, as will be apparent from the following, for use as an antiseptic and as a medium for introducing iodine into nutritional material or the like, as well as for pharmacological purposes.

One of the objects of the present invention is to provide a superior and stable water-soluble base-solution in which free iodine may be dissolved.

Another object of the present invention is to provide a superior stable solution soluble in water and having the capacity for holding free iodine in solution.

A further object of the present invention is to provide a water-soluble iodine compound which is effective as an antiseptic without being unduly hurtful to tissues.

Still another object of the present invention is to provide an iodine compound comprising a water-soluble base-solution of superior character with an appreciable amount of free iodine, the whole being characterized by stability and water solubility.

A still further object of the present invention is to provide a superior and economical method whereby a so-called base-solution may be produced which is stable and which is capable of dissolving iodine to form a water solution of free iodine.

With the above and other objects in view, as will appear to those skilled in the art from the present disclosure, this invention includes all features in the said disclosure which are novel over the prior art and which are not claimed in any separate application.

I have found that in the presence of a suitable "carrier" iodine may be caused to react with protein-derivatives such as amino-acetic acid (glycine, glycocoll) to form a stable water-soluble complex. This water-soluble complex in water has the power of dissolving solid iodine to form an aqueous solution of free iodine, and for purposes of convenience of description will sometimes be herein referred to as a "base-solution."

In one of its phases the present invention contemplates producing an aqueous base-solution which is capable of holding considerable quantities of free iodine in solution. Such a base-solution may be so treated as to reduce its acidity, and free iodine may be added either before or after or in the absence of a treatment to reduce the acidity of the base-solution.

*Preparation of base-solution*

By way of illustration of a mode of preparing a base-solution in accordance with the present invention, 30.8 grams of amino-acetic acid may be dissolved in 15 c. c. of water (this solution is not complete) and 0.156 gram (more or less) of metallic iron preferably in the form of filings ("carrier") may be added and all of the ingredients jointly heated, preferably to boiling. Forty-eight grams of solid iodine may now be slowly added at the rate of 3 to 5 grams at a time. A reaction occurs, accompanied by the apparent disappearance of the solid iodine, which seems to first dissolve and then to react and fade into the solution.

Each portion of iodine is preferably allowed to react completely before the next portion is added to the solution. The fading of the color when the solid iodine is added to the solution as above referred to, is not complete but is quite marked and this lack of complete fading can, in all probability, be ascribed to the presence of some ferric-iodide. As the reaction referred to nears completion, it becomes slower and the last portion of the iodine added takes a considerably longer time to completely react than is the case with the first portion added.

Preferably, the solution above referred to is tested from time to time after the addition of the last portion of iodine by employing a spot plate and starch to test for free iodine. When the test produces no reaction for free iodine, the base solution may be viewed as complete and it should be removed from the heating medium and permitted to cool. Any excess carrier may now be separated from the solution. If desired, insufficient iodine may be added when at a later stage more iodine is to be added in order to provide an abundance of free or uncombined iodine. On the other hand, excess iodine over and above the amount which will combine, may be added, though the proportions above referred to are preferred.

The nature of the reaction between the amino-acetic acid and the iodine and water is not definitely known at the present time but, as before noted, the reaction between the iodine and the amino-acetic acid is rapid at first but slows when the reaction is nearing completion.

Solutions in which one mole of amino-acetic acid has been reacted with 0.93 mole of iodine are the most nearly complete reactions definitely noted, but it is indicated that the ultimate reaction-product is one in which one mole of amino-acetic acid reacts with one mole of iodine.

It has been noted that a definite relationship appears to exist between the amount of iodine-amino-acetic acid reaction-product present in a given aqueous solution, and the free iodine which the solution will take up. It appears that if this relationship is exceeded, as for instance in hot solution or in a concentrated solution, free iodine will be apt to crystallize out either upon cooling or upon dilution, leaving a solution of definite ratio between combined and free iodine.

The base-solution as thus produced constitutes the solution of the reaction-product between iodine and amino-acetic acid and contains no free iodine, as may be evident by a negative starch test. The iodine is apparently ionic and will precipitate silver-iodide from a silver-nitrate solution. It is advantageous that the base-solution be made as concentrated as possible, since free iodine dissolves readily and rapidly in a concentrated base-solution but rather slowly in a dilute base-solution.

Under some conditions, the iron constituting the "carrier" in the above example is most advantageously added in several portions, each portion being added when the reaction becomes sluggish.

The base-solution is preferably kept entirely free of other or foreign organic matter so as to avoid the formation of unwanted iodine compounds, such as iodoform, which might seriously affect the stability of the solution.

The base-solution, as prepared in accordance with the above instructions, will contain some ferric-iodide which will slightly color the solution. This ferric-iodide may be removed from the base-solution to render the same colorless or substantially colorless by a treatment with activated-charcoal. The treatment referred to is preferably effected while the base-solution is hot or by persistently agitating the base-solution in the presence of activated-charcoal.

If desired, the base-solution may be reduced in acidity prior to the introduction of free iodine by the addition of materials to the base-solution of the character described under the heading "Reducing the acidity of the iodine solutions," herein.

*Preparation of free-iodine-containing solutions*

To produce a free iodine solution containing 1 gram free iodine per 100 c. c., 12 grams of solid iodine may be added to the cooled base-solution above referred to, in which the said solid iodine promptly dissolves. The resultant solution may be then diluted with water to 1200 c. c., in which condition the aqueous solution will contain approximately 4% combined iodine and 1% free iodine.

The above-described aqueous solution of combined and free iodine possesses marked anti-septic properties combined with minimum irritation to tissues.

By way of example, a more highly concentrated solution containing both combined and free iodine may be produced. For instance, to produce 150 c. c. of solution containing approximately 14% combined iodine and 8% free iodine the following steps may be followed.

A base-solution may be first prepared by reacting or intermixing 13.5 grams of amino-acetic acid, 8 c. c. of water, 0.02 gram (more or less) of iron and 21 grams of solid iodine, all of which may be reacted as previously described. After the completion of the reaction and the cooling of the solution, the unreacted carrier may be separated from the solution. Twelve grams of solid iodine may now be added and the whole diluted to 150 c. c. The base-solution previously described will take up large amounts of free iodine which by way of example may be materially in excess of 45 grams of free iodine per 100 c. c. of base-solution.

*Iodine compound for pharmacological purposes*

Preferably, iodine solutions for nutritive or internal iodine-therapeutic purposes should contain only combined iodine and no appreciable amount of free iodine. The iodine solutions for the purposes referred to may be made by diluting the base-solutions, before described, with water, and preferably reducing the acidity, a treatment such as is hereinafter described.

Two of the most useful solutions for pharmacological or nutritive purposes may be prepared by diluting the base-solution previously described with water to provide (a) a solution containing one grain of combined iodine per fluid ounce and (b) a solution containing ten grains of combined iodine per fluid ounce.

*Reducing the acidity of the iodine solutions*

The solutions previously described will contain a considerable amount of free acid. It has been found that the taste as well as the physiological action of the base-solution may be advantageously modified by the addition of one or more of the following: alkaline salts or hydroxides of an alkali metal, and alkaline salts or hydroxides of an alkaline-earth metal.

The alkali may be added to either the base-solution or the base-solution after the same has dissolved free iodine, save that in the latter case a strong alkali, such as caustic soda (NaOH), should not be added thereto, but only one or more mild alkalis, such as sodium bicarbonate, potassium bicarbonate, etc. The addition of a strong alkali such as caustic soda to the base-solution containing added free iodine is objectionable because of the formation of iodates and iodoform, which will deleteriously affect such a solution by causing a decrease in the free iodine content thereof.

Since all the salts in solution are ionized and exist as sodium, potassium, hydrogen, chloride, sulphate and iodide ions and not as salts per se, the particular combinations chosen to reduce the acidity of the base-solution and/or the base-solution plus free iodine, are relatively unimportant so long as the precaution against the use of strong alkali in connection with the solutions containing free iodine is observed.

The possible combination of alkali metal salts and/or salts of alkaline-earth metals are too numerous to attempt to list herein, but will be obvious to those skilled in the art from the present disclosure.

One of the most advantageous combinations found has been a combination of sodium bicarbonate, potassium chloride, sodium chloride and sodium sulphate.

By way of example, to one gallon of base-solution containing approximately 5% combined iodine and no free iodine, the following may be added:

| | Grams |
|---|---|
| Sodium bicarbonate ($NaHCO_3$) | 73 |
| Potassium chloride (KCl) | 28 |
| Sodium chloride (NaCl) | 13.2 |
| Sodium sulphate ($Na_2SO_4$) | 3.8 |

Résumé

From the foregoing, it will be seen that the so-called "base-solution" constitutes what may be termed a glycine-hydro-iodide which, when treated as described to reduce acidity, becomes converted into an alkali metal (sodium potassium) salt of glycine-hydro-iodide with water, or an alkaline-earth metal (calcium, magnesium) salt of the glycine-hydro-iodide. Such alkalized base-solution may be used as such for pharmacological or nutritive purposes when so alkalized, or the said base-solution, whether alkalized or not, may by the addition of free iodine be converted into a highly efficacious antiseptic. It is preferred that when the solution is prepared for antiseptic purposes that it be alkalized to minimize irritation to tissues, in addition to carrying appreciable amounts of free iodine.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A method for producing a water-soluble aqueous solution characterized by its capacity for holding free iodine in solution, which method comprises reacting iodine with amino-acetic acid in the presence of iron and in the presence of water.

2. A method for producing a water-soluble aqueous solution characterized by its capacity for holding free iodine in solution, which method comprises reacting iodine with amino-acetic acid in the presence of iron and in the presence of water; and introducing an acidity-reducing agent selected from the group consisting of alkaline salts of alkali metals and alkaline-earth metals.

3. A stable base-solution for dissolving and holding free iodine in solution, comprising an aqueous solution of the reaction product of iodine and amino-acetic acid and characterized by substantial freedom from caustic soda in the form of sodium hydroxide and from foreign organic matter to thus guard against the undue formation of deleterious iodine compounds such as iodoform when free iodine is added to the said base-solution.

4. A stable base-solution for dissolving and holding free iodine in solution, comprising an aqueous solution of the reaction product of iodine and amino-acetic acid and characterized by substantial freedom from caustic soda in the form of sodium hydroxide and from foreign organic matter to thus guard against the undue formation of deleterious iodine compounds such as iodoform when free iodine is added to the said base-solution; and an acidity-reducing agent selected from the group consisting of alkaline salts of alkali metals and alkaline-earth metals.

5. A stable aqueous solution of chemically-combined iodine and free iodine, including in combination: an aqueous solution of the reaction product of iodine and amino-acetic acid; and free iodine; the resultant aqueous solution being characterized by substantial freedom from caustic soda in the form of sodium hydroxide and from foreign organic matter to thus guard against the undue formation of deleterious iodine compounds such as iodoform by the combination of such foreign organic matter with the said free iodine constituent.

6. A stable aqueous solution of chemically-combined iodine and free iodine, including in combination: an aqueous solution of the reaction product of iodine and amino-acetic acid; free iodine; and an acidity-reducing agent selected from the group consisting of alkaline salts of alkali metals and alkaline-earth metals; the resultant aqueous solution being characterized by substantial freedom from caustic soda in the form of sodium hydroxide and from foreign organic matter to thus guard against the undue formation of deleterious iodine compounds such as iodoform created by the combination of such foreign organic matter with the said free iodine constituent.

PAUL JOHN WITTE.